(12) United States Patent
Ferret

(10) Patent No.: US 9,545,970 B2
(45) Date of Patent: Jan. 17, 2017

(54) VEHICLE, FOR EXAMPLE OF THE SCOOTER TYPE, WITH FOLDING SYSTEM

(75) Inventor: Patrick Ferret, Bousbecque (FR)

(73) Assignee: Decathlon, Villeneuve d'Ascq (FR)

(*) Notice: Subject to any disclaimer, the term of this patent is extended or adjusted under 35 U.S.C. 154(b) by 0 days.

(21) Appl. No.: 14/234,645

(22) PCT Filed: Jul. 24, 2012

(86) PCT No.: PCT/FR2012/051761
§ 371 (c)(1),
(2), (4) Date: Jan. 24, 2014

(87) PCT Pub. No.: WO2013/014391
PCT Pub. Date: Jan. 31, 2013

(65) Prior Publication Data
US 2014/0151982 A1    Jun. 5, 2014

(30) Foreign Application Priority Data

Jul. 26, 2011  (FR) ...................... 11 56809

(51) Int. Cl.
  *B62K 15/00* (2006.01)
  *B62K 3/00* (2006.01)
(52) U.S. Cl.
  CPC ............ *B62K 15/006* (2013.01); *B62K 3/002* (2013.01)
(58) Field of Classification Search
  USPC ...................... 280/87.041–87.045
  See application file for complete search history.

(56) References Cited

U.S. PATENT DOCUMENTS

| 6,173,976 B1* | 1/2001 | Lee .......................... 280/87.05 |
| 6,270,097 B1 | 8/2001 | Lin |
| 6,494,469 B1* | 12/2002 | Hara et al. ............... 280/87.041 |
| 2002/0105158 A1 | 8/2002 | Stewart |
| 2002/0180169 A1* | 12/2002 | Kwok ...................... 280/87.041 |
| 2013/0307240 A1* | 11/2013 | Petutschnig ............ 280/87.042 |

FOREIGN PATENT DOCUMENTS

| CN | 2414981 Y | 1/2001 |
| DE | 20100486 U1 | 3/2001 |
| GB | 174175 A | 1/1922 |

* cited by examiner

*Primary Examiner* — Erez Gurari
(74) *Attorney, Agent, or Firm* — Bookoff McAndrews, PLLC

(57) ABSTRACT

The invention relates to a vehicle with a folding system, and is applicable to the field of foldable scooter-type vehicles. The vehicle comprises a chassis (1) able to support a user and a steering assembly (2, 3, 4) comprising at least one steering column (2), the vehicle being able to assume a usage configuration and a folded configuration.
The chassis is connected to the steering assembly around at least one pivot axis (6), and has a first support (1*a*) intended to support the user that extends towards the steering assembly in a front portion beyond the pivot axis, so that pressing on the front portion makes it possible to go from the usage configuration to the folded configuration by pivoting around the pivot axis.
The vehicle comprises also an unlocking means (7) able to cooperate with the steering assembly (2, 3, 4) to lock or unlock the pivoting, the unlocking means (7) being arranged at the front portion of the support part.

20 Claims, 3 Drawing Sheets

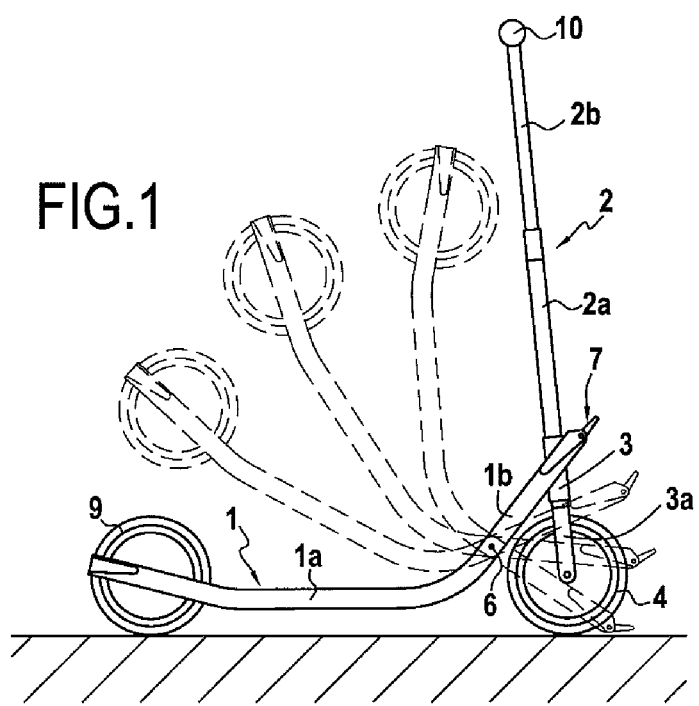
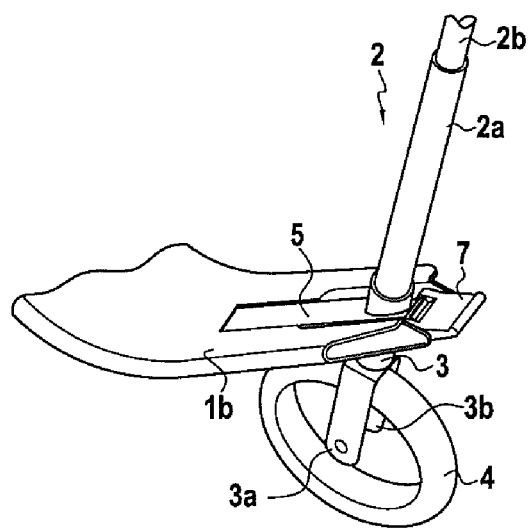

VEHICLE, FOR EXAMPLE OF THE SCOOTER TYPE, WITH FOLDING SYSTEM

TECHNICAL FIELD

The disclosure relates to a vehicle with a folding system, and is applicable to the field of foldable scooter-type vehicles.

BACKGROUND

The folding system, for such a vehicle, of course makes it possible to reduce its bulk for storage thereof, but also to carry it easily.

Scooter-type vehicles are known, such as the vehicle described in U.S. Pat. No. 6,270,097, comprising a chassis connected to a pivot steering assembly around a pivot axis, so that the vehicle can assume a first usage configuration, making it possible to move the vehicle and its user, and in a second, folded configuration in which the chassis is brought against the pivot steering assembly.

Folding is therefore an essential function that is obtained by allowing the chassis to pivot relative to the steering assembly.

This pivoting must of course be prohibited in the usage configuration, in particular to prevent folding during movement.

In devices like that described in U.S. Pat. No. 6,270,097, the pivoting can be locked or unlocked mechanically by a relatively complex system, as for example described in FIGS. 2 to 6 of that document.

More generally, solutions are known aiming to block the pivoting, which are based on the use of a locking or unlocking lever with a tightening lever to reduce the play, a spring latch with a position indexing finger, or a gripping wheel to block pivoting.

The problem posed by all of these solutions is that they are not intuitive and easy to implement, in particular because they require several actions by the user generally involving several parts of the body: the user must, for instance, lower himself, unlock the system by hand, fold the vehicle, lock the system, stand up, etc.

Moreover, most of the time these solutions require finding the "neutral" position of the locking system so as to be able to actuate it. This requires eliminating the stresses exerted on the locking system, such as the weight of the steering assembly or the weight of the chassis.

Moreover, upon use, such solutions tend to acquire play. To resolve that problem, it is possible to attach tightening systems. But such systems still further complicate the implementation of the folding and unfolding of the vehicle.

SUMMARY OF THE DISCLOSURE

Embodiments of the disclosure therefore aim to resolve the aforementioned problems, among others.

The disclosure thus relates to a vehicle, for example of the scooter type, comprising a chassis able to directly or indirectly support a user and a steering assembly comprising at least one steering column. The steering column extends along a longitudinal axis.

The vehicle can assume a usage configuration in which the chassis forms a first non-zero angle with the steering column and a folded configuration in which the chassis forms a second angle smaller than the first angle with the steering column.

The chassis is connected to the pivot steering assembly around at least one pivot axis.

This chassis has a support part intended to directly or indirectly support the user, which extends towards the steering assembly in a front portion beyond the pivot axis and the steering column, so that pressure on the front portion makes it possible to go from the usage configuration to the folded configuration by pivoting around the pivot axis.

In a first alternative embodiment, the front portion forms a non-zero and non-flat angle with the support portion, preferably an angle between 110° and 140°.

Alternatively, the front portion can be substantially aligned with the support portion.

In a second alternative embodiment, possibly combined with one or the other of the preceding two embodiments, the chassis is connected to the steering assembly via a connecting element having a first end connected to the steering column and a second end pivotably connected to the chassis around the pivot axis.

In this second alternative, in the usage configuration, the front portion can be arranged substantially parallel to the connecting element.

Also in this second alternative, in the folded configuration, the front portion can form a non-zero angle with the connecting element, preferably an angle between 60° and 100°, or between 85° and 95°.

As it is referred to in the disclosure, the vehicle comprises a locking device able to block the pivoting of the chassis relative to the steering assembly around the pivot axis in the usage configuration.

The locking device is able to automatically allow blocking of the pivoting, when the usage configuration is reached and/or when the folded configuration is reached.

The locking device comprises an unlocking means able to cooperate with the steering assembly, possibly via the connecting element, to lock or unlock the pivoting. The unlocking means is arranged at the front part of the support part of the chassis.

Advantageously, the unlocking means consists of a pedal that can be actuated by the user's foot.

Advantageously, this unlocking means comprises also at least one actuator, such as a push button, preferably arranged in the upper portion of the steering assembly, for example on a handlebar or a steering knob.

As a variant, this unlocking means also comprises a remote control.

Such a pedal can, for example, cooperate on the one hand with the chassis and on the other hand with the steering assembly, possibly via the connecting element, so that an action by the user's foot causes the chassis first to unlock, then to pivot.

This pedal is preferably arranged at the front of the front portion of the chassis, or laterally to said front portion of the chassis.

In a fourth alternative, possibly combined with one or more of the preceding ones, the front portion of the chassis constitutes, in the folded configuration, a support element on a support surface for the vehicle.

In a fifth alternative, possibly combined with one or more of the preceding ones, the steering column supports, by one of its two ends, at least one moving part, such as a wheel or rolling skate, able to be in contact with a support surface and to allow the vehicle to move on said support surface when said vehicle is set in motion.

In a sixth alternative, possibly combined with one or more the preceding ones, the chassis supports, preferably by its end opposite the front portion, at least one moving part, such as a wheel or rolling skate, able to be in contact with a support surface and to allow the vehicle to move on said support surface when said vehicle is set in motion.

BRIEF DESCRIPTION OF THE DRAWINGS

Other features and advantages of the disclosure will appear more clearly and completely upon reading the following description of preferred embodiments, which are provided as non-limiting examples and in reference to the following appended drawings:

FIG. 1: diagrammatically shows a first example of a vehicle according to embodiments of the disclosure, in the usage configuration, FIG. 2: diagrammatically shows the detail of the front portion of the example of FIG. 1, FIG. 3: diagrammatically shows the example of FIG. 1, in the folded configuration.

DETAILED DESCRIPTION

Figure 3:
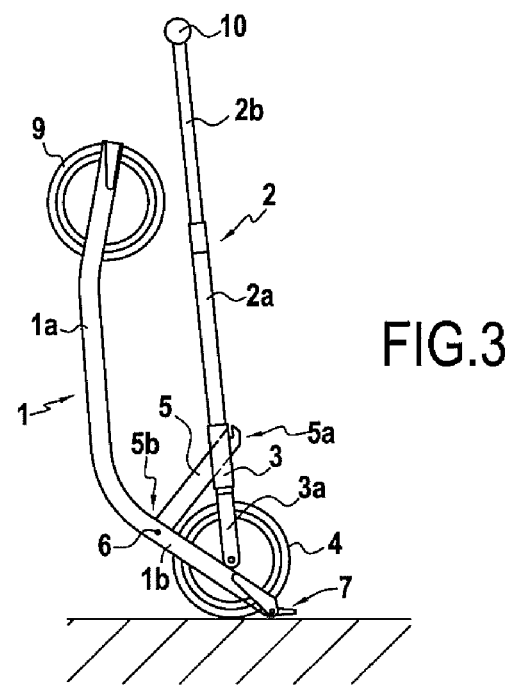

The example shown in FIG. 1 corresponds to a scooter-type vehicle with a steering assembly 2, 3, 4 connected to a chassis 1 that can support a user.

The steering assembly comprises a steering column 2 supporting a moving part 4, directly or via a fork 3 with two lateral branches 3a, 3b (branch 3b only being visible in FIG. 2), or still another connecting piece.

As it is represented on the different figures, the steering column 2 extends along a longitudinal axis.

This moving part can of course traditionally be a wheel 4, as shown in FIG. 1. It can also involve a skate allowing the vehicle to slide on a support surface, or any other part able to be put in contact with the support surface, and allowing the vehicle to be set in motion relative to, and on, this support surface.

The steering column 2 can comprise a base tube 2a in which an upper tube 2b slides topped by a handlebar 10, or a steering knob 10, or any element making it possible to facilitate the action by the user on the steering assembly 2, 3, 4.

The assembly of the steering column 2 with a base tube 2a in which the upper tube 2b slides in particular makes it possible to adjust the height of said steering assembly 2, 3, 4.

The chassis 1 is preferably also provided with a moving part 9, which here again assumes the form of a wheel 9 as shown in FIG. 1, but which could also be a sliding skate.

This chassis 1 is broken down into a support part 1a, intended to form a direct or indirect support for the user, and a front portion 1b.

Specifically, the support part 1a extends towards the steering assembly 2, 3, 4, in the front portion 1b.

As it is represented on the different figures, the front portion 1b comprises an end opposite the support part 1a extending beyond the steering column 2, and specifically beyond the longitudinal axis of the steering column.

The chassis 1 is pivotably connected to the steering assembly 2, 3, 4, around at least one pivot axis 6.

The extension of the support part 1a of the chassis 1 in the front portion 1b goes beyond the pivot axis, and beyond the steering column.

Thus, simple pressure on the front portion 1b of the chassis makes it possible to go from the usage configuration, as shown in FIG. 1, to the folded configuration, as shown in FIG. 3 and which will be described later in reference to said FIG. 3.

This transition from the usage configuration to the folded configuration is obtained by pivoting the chassis 1 around the pivot axis 6 relative to the steering assembly 2, 3, 4.

This transition has been diagrammed in FIG. 1, showing three successive intermediate positions in broken lines.

In this example shown in FIG. 1, the front portion 1b and the support part 1a form an angle preferably between 110° and 140°, or even 130°.

Thus, the front portion 1b extends above the moving part 4, in this example the front wheel 4.

Figure 4:
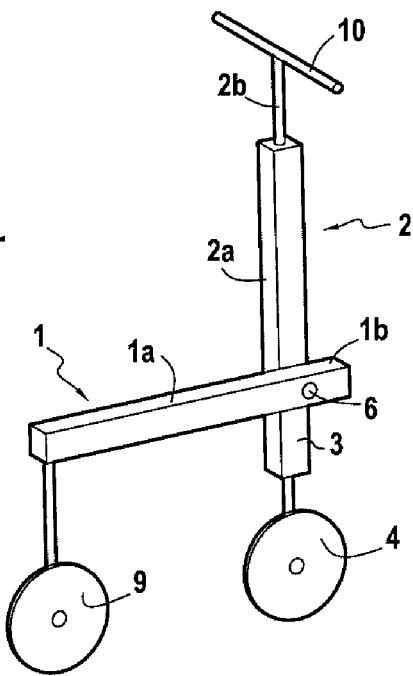
FIG. 4: diagrammatically shows another example of a vehicle according to embodiments of the disclosure.

Alternatively, as shown in FIG. 4 in a very simplified manner compared to the illustration of FIG. 1, the chassis 1 comprises a support part 1a and a front portion 1b that are substantially aligned.

A locking device 7 is provided, making it possible to block the pivoting of the chassis 1 relative to the steering assembly 2, 3, 4, in particular for safety reasons in the usage configuration, but also to allow blocking in the folded configuration without accidental unfolding.

Preferably, this locking device 7 allows automatic blocking of the pivoting of the chassis 1 relative to the steering assembly 2, 3, 4 when the usage configuration is reached and/or when the folded configuration is reached.

This locking device 7 in particular comprises an unlocking means 7, which is able to cooperate with the steering assembly 2, 3, 4, directly or indirectly, to lock or unlock the pivoting of the chassis 1 relative to the steering assembly 2, 3, 4.

As represented on the different figures, the unlocking means 7 is secured on the end of the front portion 1b opposite the support part 1a of the chassis 1 and extends beyond the longitudinal axis defined by the steering column 2. In the usage configuration of the scooter-type vehicle, the unlocking means 7 is disposed above the moving part 4.

The unlocking means, in this example, extends upwards beyond the steering column, so that it can be easily actuated by the user, especially by a downwards pressure applied by the foot.

As shown in the example of FIG. 1, this unlocking means 7 can assume the form of a pedal 7 able to be actuated by the user's foot.

Alternatively, one or more actuators other than a pedal could for example be arranged in the upper portion of the steering assembly 2, 3, 4.

This could involve an actuator of the push button type, for example arranged on or near the handlebar 10 or steering knob 10.

Figure 5:
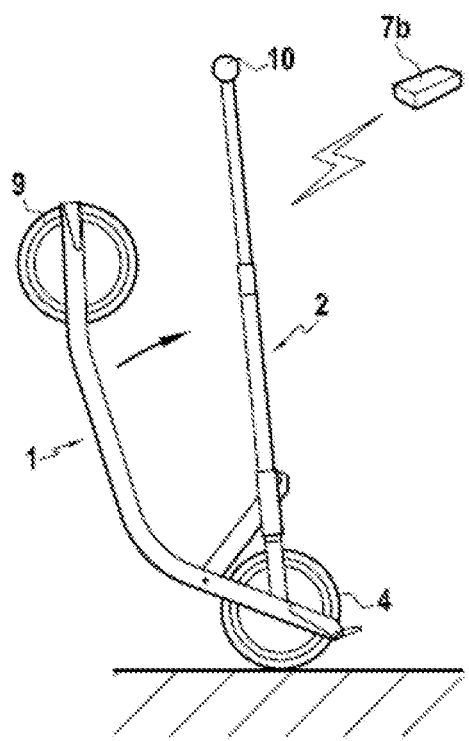
FIG. 5: diagrammatically shows another example of a vehicle according to embodiments of the disclosure, the vehicle comprising a remote control.

The unlocking means could also comprise a remote control 7b as shown in FIG. 5, making it possible to actuate such an actuator or any other type of actuator.

In the case of the pedal 7 shown in FIG. 1, the latter cooperates on the one hand with the chassis 1 and on the other hand, directly or indirectly, with the steering assembly 2, 3, 4.

This pedal is preferably configured so that an action by the user's foot on said pedal 7 first causes, by a sole action performed by the user, the unlocking, then the pivoting of the chassis 1 relative to the steering assembly 2, 3, 4.

This pedal is arranged at the front of the chassis 1, specifically at the front of the front portion 1b of the chassis 1, as shown in FIG. 1, or laterally to said front portion 1b of the chassis 1.

As shown in the detail of the front portion shown in FIG. 2, still in the usage configuration, the chassis 1 is in this example indirectly connected to the steering assembly 2, 3, 4, via a connecting element 5. The connecting element 5 is thus secured to the steering column and pivotably connected to the chassis around the pivot axis 6.

As shown in particular in FIG. 2, the end of the front portion 1b opposite the support part 1a of the chassis 1 has a U shape which is opened in the direction of the end of the front portion 1b; the connecting element 5 is restrained in the U-shaped end.

Precisely, this connecting element 5 has a first end 5a connected to the steering column 2, and an opposite end 5b pivotably connected to the chassis 1 around the pivot axis 6.

In the usage configuration, and as represented on FIG. 2, the first end 5a of the connecting element 5 carries a locking organ, in this example but not exclusively a hook, arranged to cooperate with the locking device 7, the locking device 7 being secured to the end of the front portion 1b of the chassis 1.

In this alternative, the locking device 7 therefore blocks the pivoting of the chassis 1 relative to the steering assembly 2, 3, 4, indirectly, i.e. via a blocking of the pivoting relative to the connecting element 5.

Moreover, the unlocking means 7 comprised in the locking device 7 cooperates, to lock or unlock the pivoting, with the steering assembly 2, 3, 4 indirectly, i.e. via a cooperation with the connecting element 5.

In this alternative with the presence of the connecting element 5, the front portion 1b of the chassis 1 is found, in the usage configuration, arranged substantially parallel to said connecting element, as shown in FIG. 2.

In this alternative, when the scooter-type vehicle is in the usage configuration, the unlocking means 7 is disposed beyond the pivot axis 6, and beyond the longitudinal axis defined by the steering column 2, so that the actuation of the unlocking means 7, for instance and in a non-limitative manner by the user's foot, causes, successively and in a single action, first the unlocking, then the pivoting of the chassis 1 relative to the steering assembly 2, 3, 4 in order to pass, by a single action performed by the user, from the usage configuration to the folded configuration.

In this example, the pressure exerted on the unlocking means is directed towards the moving device (the wheel) towards the ground.

Moreover, still in this alternative with the presence of the connecting element 5, the front portion 1b of the chassis 1 is, in the folded configuration, arranged so as to form a non-zero angle with said connecting element 5, as shown in FIG. 3. This angle is preferably between 60 and 100°, or even between 85° and 95°. A value equal or close to 90° yields particularly satisfactory results.

As represented in particular in FIG. 3, when the scooter-type vehicle is in the folded configuration, the end of the front portion 1b opposite the support part 1a of the chassis 1 and/or the locking device 7 form a support element on a support surface for the scooter-type vehicle.

The presence of such a connecting element 5 in particular makes it possible to move the pivot axis 6 away from the front portion 1b of the chassis 1, and to thereby obtain a greater lever for the transition from the usage configuration to the folded configuration.

This connecting element 5 also makes it possible to move the pivot axis 6 away from the locking system and therefore to limit the play at the locking system. This makes it possible to avoid having to attach a play recovery system.

FIG. 3 also shows the fact that, in this embodiment, the front portion 1b of the chassis 1 constitutes, in this folded configuration, a support element on the support surface to move the vehicle.

When the locking device 7, and in particular the unlocking means 7, is arranged at the front of the front part 1a of the chassis 1, said unlocking means 7 then participates in the support described in the preceding paragraph.

It should be recalled that the above description is provided as an example, and therefore is not intended to limit the scope of the disclosure the true scope being set forth in the following claims.

The invention claimed is:

1. A vehicle comprising a chassis configured to directly or indirectly support a user, and a steering assembly comprising at least one steering column, said vehicle being configured to assume a usage configuration in which a front portion of the chassis forms a first non-zero angle with the steering column and a folded configuration in which the front portion of the chassis forms a second angle smaller than the first angle with the steering column, said chassis being connected to the steering assembly and pivoting around at least one pivot axis, wherein the chassis comprises a support part intended to directly or indirectly support the user and which extends towards the steering assembly at the front portion of the chassis which extends beyond the pivot axis so that application of a pressure on the front portion is configured to cause a pivoting of the chassis relative to the steering assembly about the pivot axis that results in the vehicle changing from the usage configuration to the folded configuration, the vehicle further comprising a locking device configured to block the pivoting of the chassis relative to the steering assembly around the pivot axis in the usage configuration, said locking device comprising an unlocking device configured to cooperate with the steering assembly to lock or unlock the pivoting, the unlocking device comprising at least an actuator located in an upper portion of the steering assembly.

2. The vehicle according to claim 1, wherein the front portion forms a non-zero and non-flat angle with the support part, the angle being between 110 degrees and 140 degrees.

3. The vehicle according to claim 1, wherein the front portion is substantially aligned with the support part.

4. The vehicle according to claim 1, wherein the chassis is connected to the steering assembly via a connecting element having a first end connected to the steering column and a second end pivotably connected to the chassis around the pivot axis.

5. The vehicle according to claim 4, wherein in the usage configuration, the front portion is arranged substantially parallel to the connecting element.

6. The vehicle according to claim 4, wherein in the folded configuration, the front portion forms a non-zero angle with the connecting element, the angle being between 60 degrees and 100 degrees.

7. The vehicle according to claim 6, wherein the angle is between 85 degrees and 95 degrees.

8. The vehicle according to claim 1, wherein the locking device is arranged to automatically allow blocking of the pivoting, when the usage configuration is reached and/or when the folded configuration is reached.

9. The vehicle according to claim 1, wherein the front portion of the chassis constitutes, in the folded configuration, a support element on a support surface for the vehicle.

10. The vehicle according to claim 1, wherein the steering column supports, by one of its two ends, at least one moving part, such as a wheel or rolling skate, able to be in contact with a support surface and to allow the vehicle to move on said support surface when said vehicle is set in motion.

11. The vehicle according to claim 1, wherein the chassis supports by its end opposite the front portion, at least one moving part, such as a wheel or rolling skate, able to be in contact with a support surface and to allow the vehicle to move on said support surface when said vehicle is set in motion.

12. The vehicle according to claim 1, wherein the front portion extends beyond the pivot axis in at least one intermediate position between the usage configuration and the folded configuration.

13. The vehicle according to claim 1, wherein the locking device is also designed to block the pivoting of the chassis relative to the steering assembly around the pivot axis when the vehicle is in the folded configuration.

14. A vehicle, comprising a chassis able to directly or indirectly support a user and a steering assembly comprising at least one steering column, said vehicle being configured to assume a usage configuration in which the chassis forms a first non-zero angle with the steering column and a folded configuration in which the chassis forms a second angle smaller than the first angle with the steering column, said chassis being connected to the steering assembly pivoting around at least one pivot axis, wherein the chassis has a support part intended to directly or indirectly support the user, which extends towards the steering assembly in a front portion which extends beyond the pivot axis, so that pressure on the front portion enables changing from the usage configuration to the folded configuration by pivoting around the pivot axis, the vehicle further comprising a locking device configured to block the pivoting of the chassis relative to the steering assembly around the pivot axis in the usage configuration, said locking device comprising an unlocking device configured to cooperate with the steering assembly to lock or unlock the pivoting, the unlocking device being arranged at the front portion of the support part, the chassis being connected to the steering assembly via a connecting element having a first end connected to the steering column and a second end pivotably connected to the chassis around the pivot axis, the unlocking device comprising a pedal arranged at the front portion of the support part and being able to be actuated by the user's foot so that an action of the user's foot on the pedal causes the chassis first to unlock, then to pivot.

15. The vehicle according to claim 14, wherein the locking device is arranged to automatically allow blocking of the pivoting when the usage configuration is reached and/or when the folded configuration is reached.

16. The vehicle according to claim 14, wherein the front portion of the chassis constitutes, in the folded configuration, a support element on a support surface for the vehicle.

17. The vehicle according to claim 14, wherein the front portion extends beyond the pivot axis in at least one intermediate position between the usage configuration and the folded configuration.

18. The vehicle according to claim 14, wherein the locking device is also designed to block the pivoting of the chassis relative to the steering assembly around the pivot axis when the vehicle is in the folded configuration.

19. The vehicle according to claim 14, wherein the front portion extends beyond the steering column, the pedal being arranged at the front of the portion of the chassis.

20. The vehicle according to claim 14, wherein the pedal is arranged laterally to said front portion.

* * * * *